(12) United States Patent
Chen et al.

(10) Patent No.: US 7,114,215 B1
(45) Date of Patent: Oct. 3, 2006

(54) SLIDABLE WINDSHIELD WIPER FOR AUTOMOBILES

(76) Inventors: Chih-Wei Chen, P.O.Box 697, Feng-Yuan City, Taichung Hsien (TW) 420; I-Shan Chen, P.O.Box 697, Feng-Yuan City, Taichung Hsien (TW) 420

( * ) Notice: Subject to any disclaimer, the term of this patent is extended or adjusted under 35 U.S.C. 154(b) by 213 days.

(21) Appl. No.: 10/669,341

(22) Filed: Sep. 25, 2003

(51) Int. Cl.
*B60S 1/40* (2006.01)

(52) U.S. Cl. .............................. 15/250.32; 15/250.23; 15/250.351

(58) Field of Classification Search ............. 15/250.21, 15/250.23, 250.32, 250.351
See application file for complete search history.

(56) References Cited

U.S. PATENT DOCUMENTS

| | | | | |
|---|---|---|---|---|
| 3,453,679 A | * | 7/1969 | Thorlakson | 15/250.16 |
| 3,660,862 A | * | 5/1972 | Scinta | 15/250.23 |
| 4,208,759 A | * | 6/1980 | Nixon et al. | 15/250.23 |
| 4,347,640 A | * | 9/1982 | Durtnal | 15/250.32 |
| 5,920,949 A | * | 7/1999 | Miller | 15/250.23 |

FOREIGN PATENT DOCUMENTS

| | | | | |
|---|---|---|---|---|
| DE | 2305239 | * | 8/1973 | 15/250.23 |
| DE | 2413354 | * | 12/1974 | 15/250.23 |
| DE | 2415180 | * | 10/1975 | 15/250.23 |

* cited by examiner

*Primary Examiner*—Gary K. Graham

(57) ABSTRACT

A slidable windshield wiper for automobiles is provided. The windshield wiper has at least a wiper arm pivoted to a bottom of the windshield, a wiper blade pivoted to the top of the wiper arm, a blade rubber on the inner side of the wiper blade directed toward the windshield and an articulation rod having a hook connecting an elastic plate on the top of the wiper blade. The articulation rod has a sloped underside abutting a plane underside at lower end by which the wiper blade may slide about and form a certain angle relative to the wiper arm and moves up and downward following along with different tracks in order to completely clear the sight of the driver who drives in the rain.

1 Claim, 6 Drawing Sheets

SLIDABLE WINDSHIELD WIPER FOR AUTOMOBILES

BACKGROUND OF THE INVENTION

The present invention relates to automobile parts and more particularly to a slidable windshield wiper for automobiles which has a specially designed wiper arm enables the windshield wiper blade to slide about during wiping operation and to go different tracks between the up and downward movements.

Windshield wipers are of the indispensable parts for an automobile running in the rain. The driver uses the wipers to wipe out the rainwater to clear up the field of sight for safety driving.

However, the wiper blade rubber will become hardened without flexible property after long time use under the sunshine and the rainfall. Therefore, could not effectively wipe out the water on the windshield. Further, the dirt, contamination as well as the oil stains or the free leaves under the blade rubber hinder the wiping efficiency of the wiper.

FIGS. 1 and 2 show a prior art windshield wiper which comprises a windshield 1, at least one of the wiper arm 2 pivoted under the windshield 1, a wiper blade 3 pivoted to the top of the wiper arm 2 and a blade rubber secured under the wiper blade 3 and slidably wiping the outside of the windshield 1. Due to that the up and downward movements of the wiper blade 3 follow the same track, the water will not be effectively removed if the blade rubber 4 is serrated or cracked but causes the traces on the windshield (as shown in FIG. 2) that seriously hinders the sight of the driver and causes an accident.

SUMMARY OF THE PRESENT INVENTION

The present invention has a main object to provide a slidable windshield wiper for automobiles which has a slidable wiper blade to follow the different tracks between the up and downward movements in order to completely wipe out the water traces on the outside surface of the windshield without remaining any traces so as to clear the sight of the drivers who are driving in the rain and to prevent the automobile from an accident.

Accordingly, the slidable windshield wiper of the present invention comprises generally a pair of wiper arms pivoted under the windshield of an automobile and each having a wiper blade on the top and each of the wiper blade having a blade rubber on the underside directed toward the windshield. The feature is that the wiper arms each has an articulation rod which can be able to change the angle to facilitate the wiper blade following the different tracks between up and downward movements so as to completely wipe out the water without remaining any traces on the windshield.

The present invention will become more fully understood by reference to the following detailed description thereof when read in conjunction with the attached drawings.

DETAILED DESCRIPTION OF THE PREFERRED EMBODIMENT

Figure 1:
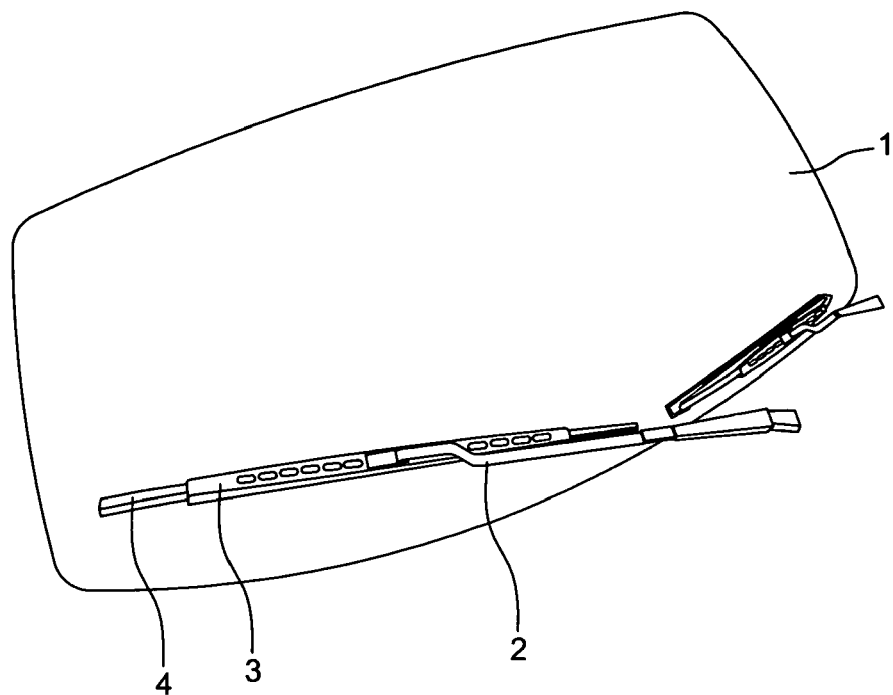
FIG. 1 is a perspective view of a windshield wiper according to a prior art.
Figure 2:
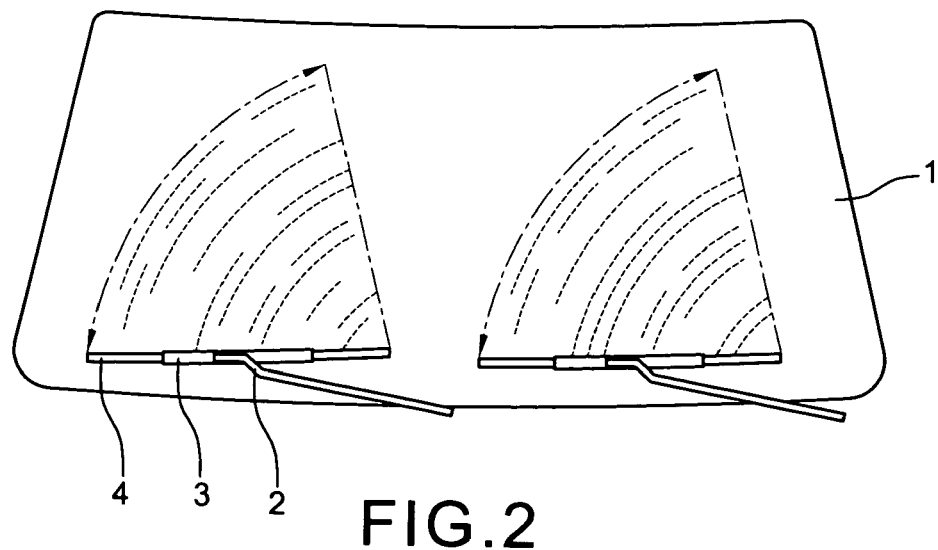
FIG. 2 is a plane view to show the windshield wipers of FIG. 2 in operation.
Figure 3:
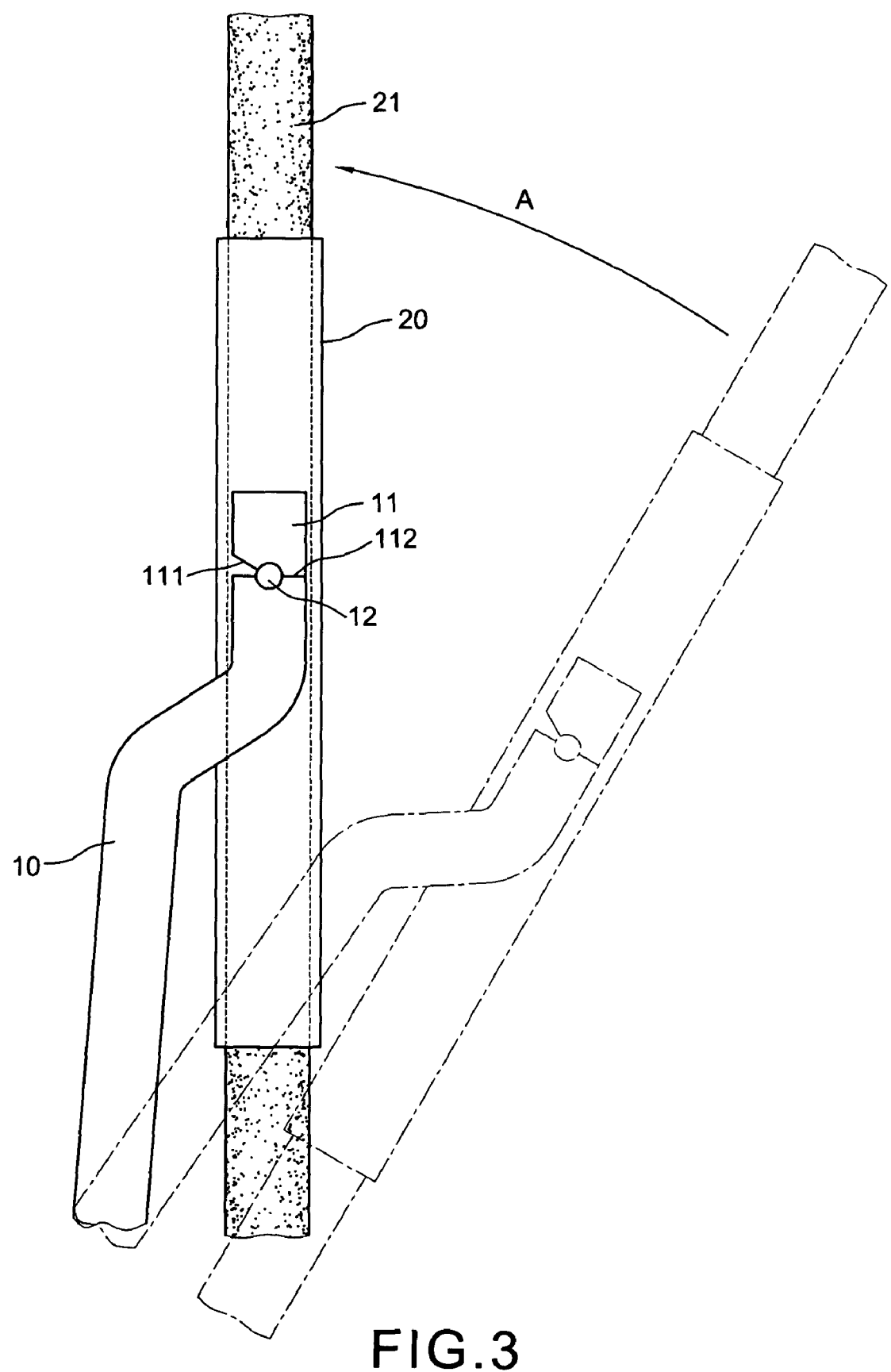
FIG. 3 is a plane view of the windshield wiper of the preferred embodiment according the present invention while the wiper blade moves upward.
Figure 4:
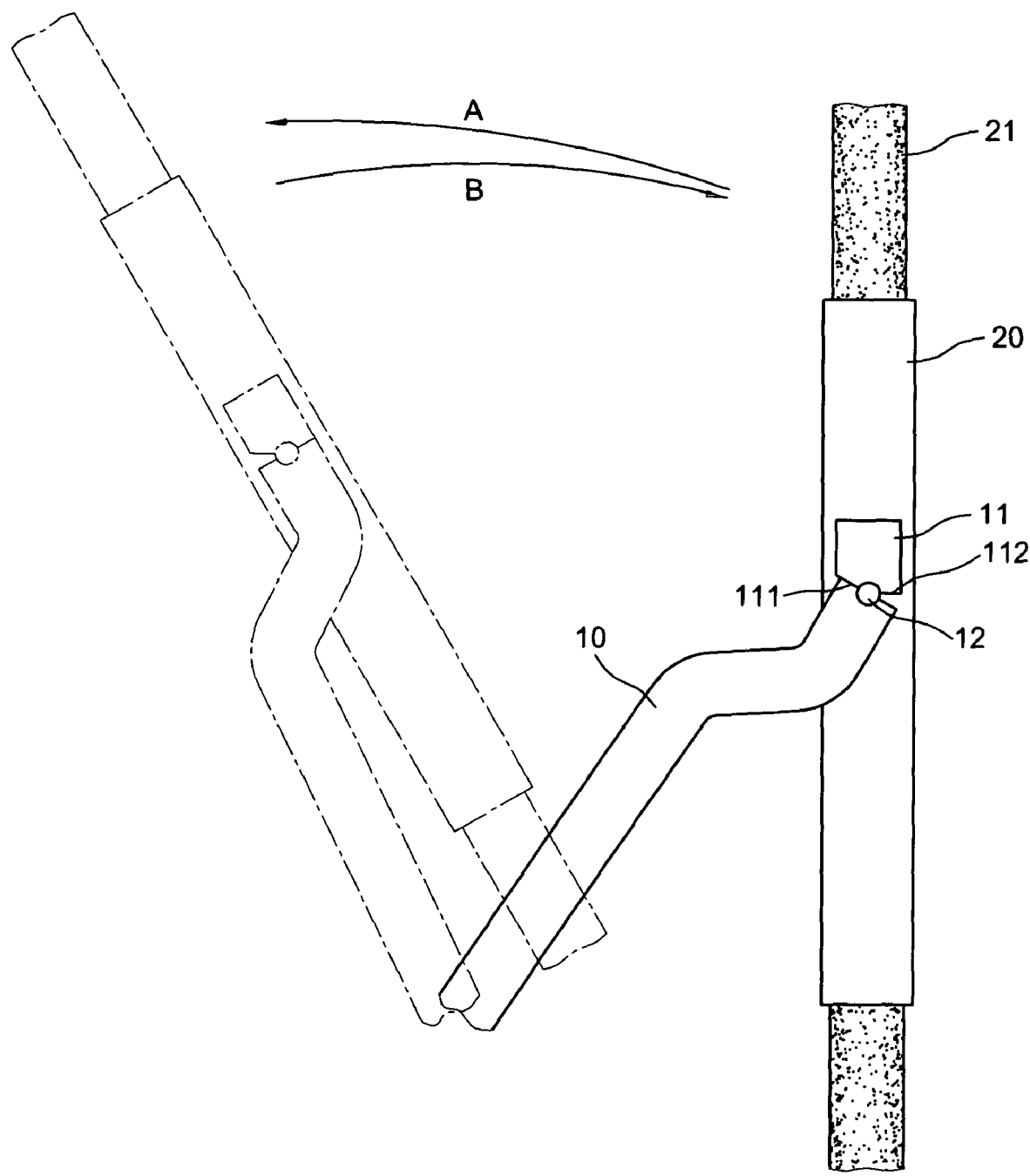
FIG. 4 is a plane view of FIG. 3 while the wiper blade moves downward.
Figure 5:
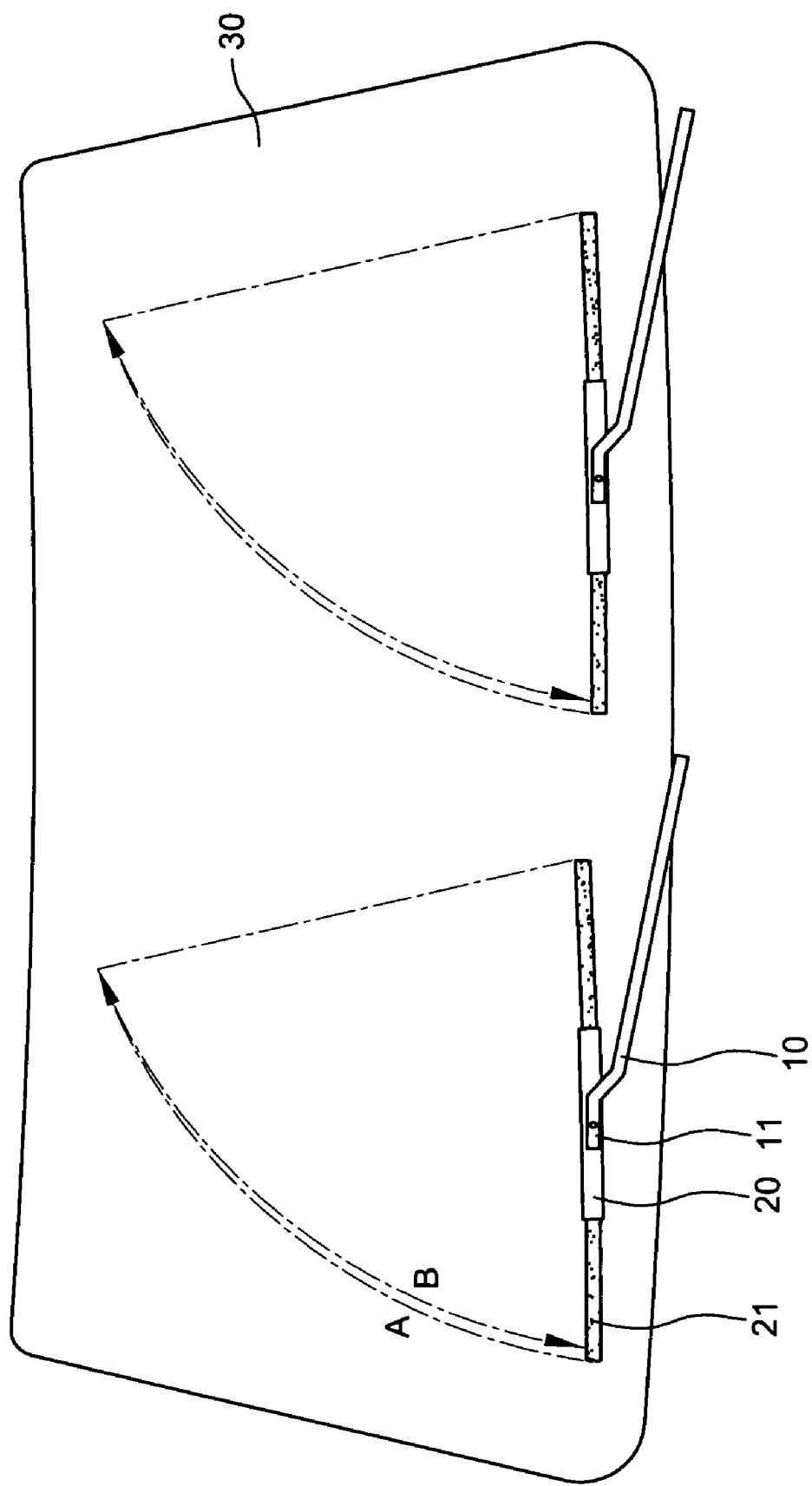
FIG. 5 is a plane view indicating the different tracks between the up and downward movement of the wiper blades.

With reference to FIGS. 3, 4 and 5 of the drawings, the slidable windshield wiper for automobiles of the present invention comprises at least a wiper arm 10 pivoted to a bottom of the windshield 30, a wiper blade 20 pivoted to a top of the wiper arm 10 by rivet 12 and positioned under the wiper arm 10 via an articulation rod 11. The articulation rod 11 has a hook connected to an elastic plate of the wiper blade 20 (not shown), a sloped underside 111 and a plane underside 112 on the lower end of the articulation rod 11.

In operation, when the wiper arms 10 actuate the wiper blades 20 together with the blade rubbers 21 moving upward, the plane undersides 112 of the articulation rods 11 are automatically stopped against the top of the wiper arms 10 due to the friction drag caused by the upward movement of the blade rubbers 21 which move along with the track A (as shown in FIGS. 3 and 5).

Normally, the blade rubber of a conventional windshield wiper is serrated and/or cracked, its up and downward movement must leave a plenty of traces on the outer surface of a windshield 30 present invention solves this problem by moving the wiper blades 20 along with the different tracks A and B between their up and downward movements without leaving any traces on the outer surface of the windshield 30. Since the windshield 30 is clear. The sight of the driver will not be ambiguous in the rain so as to prevent the automobile from an accident.

Figure 6:
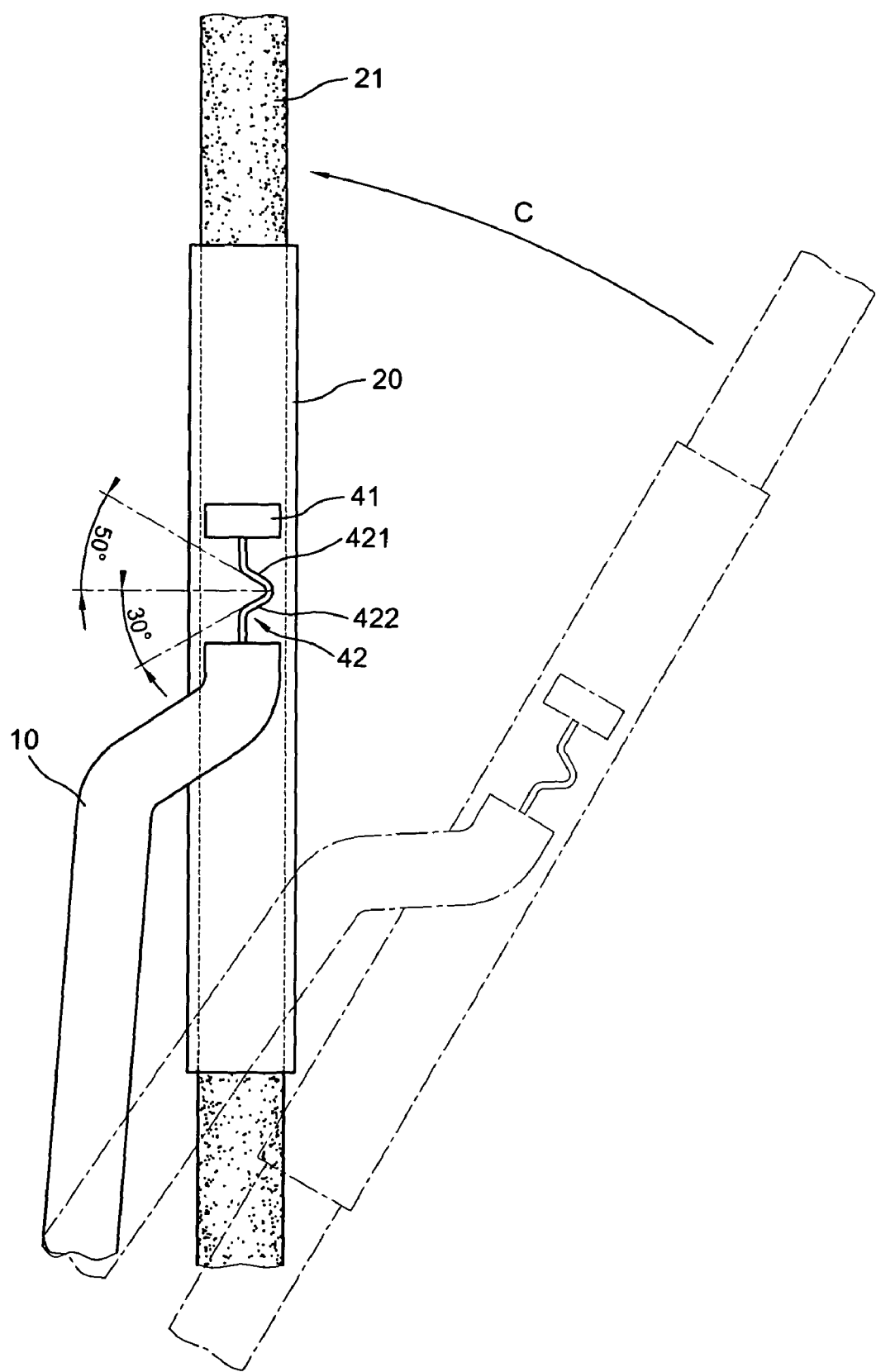
FIG. 6 is a plane view of the windshield wiper of an alternate embodiment of the present invention while the wiper blade moves upward.
Figure 7:
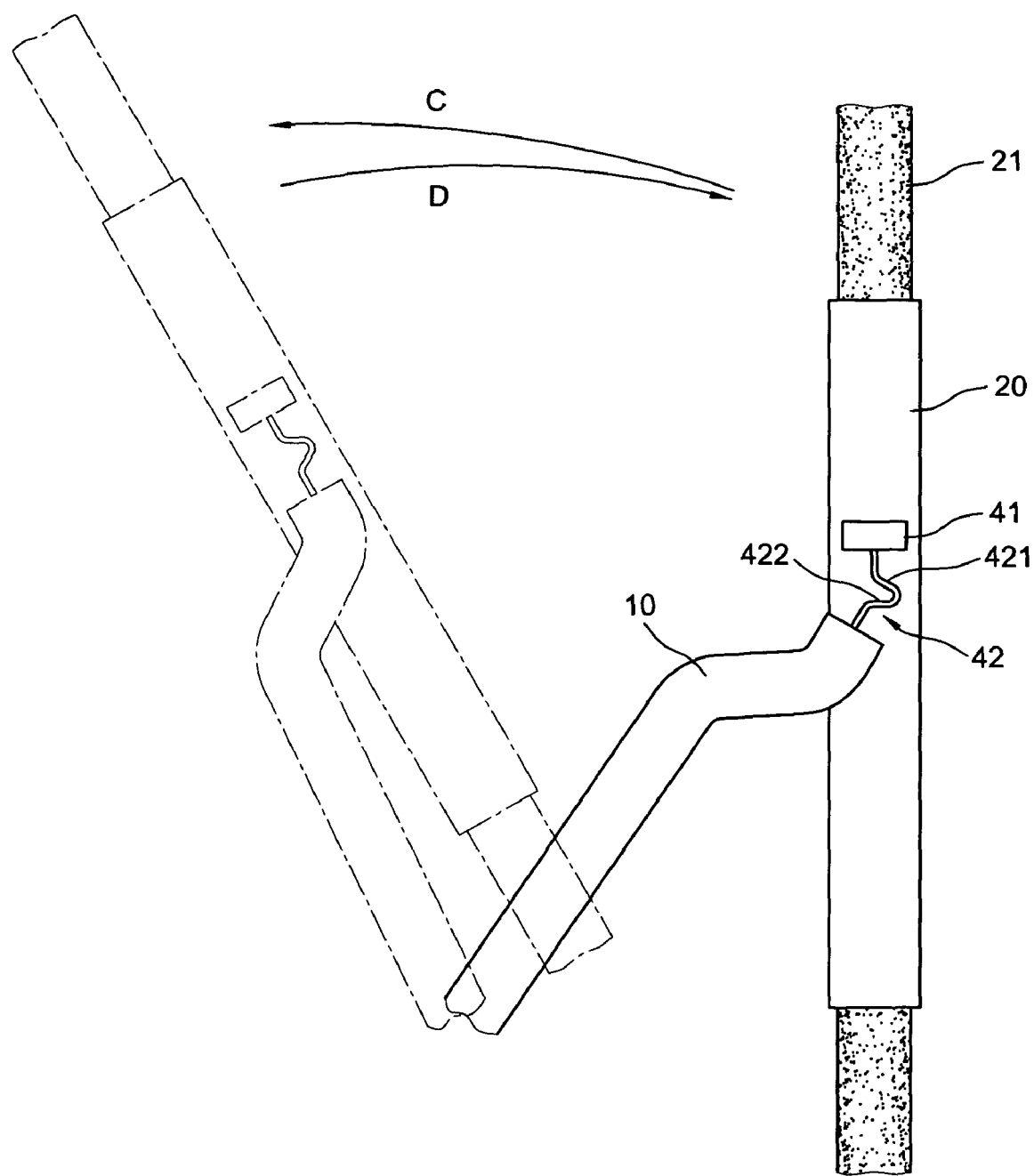
FIG. 7 is a plane view of FIG. 6 while the wiper blade moves downward.

Referring to FIGS. 6 and 7, an alternate embodiment of the windshield wiper is provided. This windshield wiper is structurally and functionally most similar to that of the above embodiment described in FIGS. 3 to 5 and the above discussions are applicable inmost instances. The only change is that the articulation rod 11 is replaced with an articulation rod 41 which connects to the top of the wiper arm 10 via a roughly V-shaped elastic member 42. The upper portion 421 of the V-shape forms about 50 degrees angle relative to a horizontal central line. Whereas, the lower portion 422 of the V-shape forms about 30 degrees relative to the horizontal central line. Due to the different angles of the upper and lower portions 421 and 422 of the V-shaped elastic member 42 and the friction drag of the blade rubbers 21, the up and downward movements follow different tracks C and D that achieves the same result as doing by the about embodiment.

The windshield wiper blades 20 of the present invention is characterized in low cost but achieving greater effectiveness. Further, the connection of the articulation rod 11 (41) with the wiper arm 10 may be replaced with a hydraulic or pneumatic rods or a guide and/or guide rod. But it are all within to the scope of the present invention.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

We claim:

1. A slidable windshield wiper for automobiles comprising:

an elongated wiper arm pivoted at a first end to a bottom of a windshield of an automobile and having a second, free end which defines a planar transverse end face;

a wiper blade having a blade rubber on one side thereof directed towards a windshield and having an articulation rod on an opposite side thereof;

said articulation rod being elongated with one end defining spaced underside surfaces angled with respect to one another;

a rivet pivotally joining the one end of the articulation rod to the second free end of the wiper arm, wherein said rivet lies on said face and enables the underside surfaces to alternatively engage the transverse end face;

whereby said articulation rod enables the wiper blade to move relative to the wiper arm such that it can follow different tracks during wiping.

\* \* \* \* \*